US008736112B2

(12) United States Patent
Linden et al.

(10) Patent No.: US 8,736,112 B2
(45) Date of Patent: May 27, 2014

(54) MULTI-TERMINAL DC TRANSMISSION SYSTEM AND METHOD AND MEANS FOR CONTROL THERE-OF

(75) Inventors: Kerstin Linden, Ludvika (SE); Gunnar Flisberg, Ludvika (SE); Lars-Erik Juhlin, Ludvika (SE); Per Holmberg, Ludvika (SE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/807,650

(22) PCT Filed: Jun. 30, 2010

(86) PCT No.: PCT/EP2010/059308
§ 371 (c)(1),
(2), (4) Date: Jan. 28, 2013

(87) PCT Pub. No.: WO2012/000548
PCT Pub. Date: Jan. 5, 2012

(65) Prior Publication Data
US 2013/0334887 A1     Dec. 19, 2013

(51) Int. Cl.
*H02J 1/00*     (2006.01)
(52) U.S. Cl.
USPC .............................................. 307/102; 307/82
(58) Field of Classification Search
USPC ................................................... 307/102, 82
See application file for complete search history.

(56) References Cited

U.S. PATENT DOCUMENTS

| | | | |
|---|---|---|---|
| 6,250,174 B1 | 6/2001 | Terada et al. | |
| 6,891,281 B2 * | 5/2005 | Wobben | 290/44 |
| 7,513,174 B2 | 4/2009 | Harada et al. | |
| 7,656,052 B2 | 2/2010 | Jones et al. | |
| 7,800,242 B2 * | 9/2010 | Stiesdal | 290/44 |
| 2005/0040655 A1 * | 2/2005 | Wilkins et al. | 290/44 |
| 2008/0111380 A1 * | 5/2008 | Delmerico et al. | 290/44 |
| 2009/0279328 A1 | 11/2009 | Jiang-Hafner | |
| 2010/0025994 A1 | 2/2010 | Cardinal et al. | |

FOREIGN PATENT DOCUMENTS

| | | |
|---|---|---|
| EP | 0 233 712 A2 | 8/1987 |
| EP | 1467463 A1 * | 10/2004 |
| JP | 2-298482 A | 12/1990 |

OTHER PUBLICATIONS

"Wireless parallel operation of high voltage DC power supply using steady-state estimatiuon", Baek et al., IEEE 0-7803-8730-9/04. Copyright IEEE 2004.*
"Voltage Conrol Method using Modified Voltage Droop COntrol in LV Distribution System", Seo et al. IEEE T&D Asia 2009.*

(Continued)

*Primary Examiner* — Fritz M Fleming
(74) *Attorney, Agent, or Firm* — Birch, Stewart, Kolasch & Birch, LLP

(57) ABSTRACT

A method for controlling power flow within a multi-terminal DC power transmission system including two or more converter stations and the corresponding multi-terminal DC power transmission system are provided. The method includes the steps of: controlling the power flow to a steady state reference operating point for operating points within a control dead band defined for each respective converter station, and controlling the power flow by means of droop control in at least one of the converter stations upon detection of exceeding of an end point of one or more of the control dead bands.

20 Claims, 3 Drawing Sheets

(56) References Cited

OTHER PUBLICATIONS

Adam, G. P. et al., "Multi-terminal dc transmission system based on modular multilevel converter," Universities Power Engineering Conference (UPEC), 2009 Proceedings of the 44th International, IEEE, Sep. 1, 2009.

Haileselassie, T. et al., "Control of Multiterminal HVDC Transmission for Offshore Wind Energy," Nordic Winder Power Conference, 2009.

Karlsson, P., "DC Distributed Power Systems—Analysis, Design and Control for a Renewable Energy System," Doctoral Dissertation in Industrial Electrical Engineering, Lund University, 2002, http://www.iea.lth.se/publications/Theses/LTH-IEA-1033.pdf.

Liang, J. et al., "Control of multi-terminal VSC-HVDC transmission for offshore wind power," Power Electronics and Applications, EPE '09, 13th European Conference on, IEEE, Sep. 8, 2009.

Majumder, R. et al., "Droop Control of Converter Interfaced Micro Sources in Rural Distributed Generation," IEEE Transactions on Power Delivery, 2010.

Peng, F. Z. et al., "Control and Protection of Power Electronics Interfaced Distributed Generation Systems in a Customer-Driven Microgrid," IEEE Power and Energy Society General Meeting, Alberta, CA, Jul. 26-30, 2009.

Xu, L. et al., "DC Grid Management of a Multi-Terminal HVDC Transmission System for Large Offshore Wind Farms," Sustainable Power Generation and Supply, 2009. Supergen '09. International Conference on, IEEE, Apr. 6, 2009.

Xu, L. et al., "Multi-Terminal DC Transmission Systems for Connecting Large Offshore Wind Farms," Power and Energy Society General Meeting—Conversion and Delivery of Electrical Energy in the 21st Century, IEEE, Jul. 20, 2008.

\* cited by examiner

MULTI-TERMINAL DC TRANSMISSION SYSTEM AND METHOD AND MEANS FOR CONTROL THERE-OF

FIELD OF THE INVENTION

The invention relates generally to the field of power transmission systems, and in particular to a multi-terminal DC power transmission system and to control thereof.

BACKGROUND OF THE INVENTION

A High Voltage Direct Current (HVDC) power transmission system is a viable alternative to alternating current (AC) power transmission systems, for example for long-distance distribution. Up to date, HVDC power transmission has been point-to-point two terminal power transmission with a few exceptions. A multi-terminal HVDC power transmission is more complex than the ordinary point-to-point power transmission. In particular, the control system is more elaborate and telecommunication requirements between stations become larger. A major reason for the more elaborate control system is difficulties to control the power flow within a large HVDC system, especially at disturbances.

In case of disturbances within the HVDC power transmission network, for example outages of converters or lines, control actions have to be taken in order to ensure stability of the network and the power distribution. The aim of any such control actions is to handle the disturbances and provide a distribution of load that is acceptable and that enables uninterrupted power to be delivered to end users.

Droop control is a well known method for handling disturbances. Such droop control is described in, for example, "Control of Multiterminal HVDC Transmission for Offshore Wind Energy", T. Haileselassie et al. The document is mainly aimed at means for avoiding the need for communication when controlling the power distribution at a disturbance. Although functioning for load distribution at large disturbances such as loss of a converter, a drawback of the described droop control method is difficulties handling minor disturbances. In particular, even a rather small error in measurement will give great impact on the whole system.

Further, the method described could operate acceptably for a star network configuration, but would encounter difficulties for other types of network configurations.

In view of the above, there is a need for a solution that ensures proper control of multi-terminal DC power transmission systems during any type of disturbance as well as during steady state operation. Further, it would be desirable to provide such solution usable for any type of network configuration.

SUMMARY OF THE INVENTION

It is an object of the invention to provide methods and means enabling an improved way of controlling a multi-terminal DC power transmission system, and in particular a control method and corresponding system that is well-functioning irrespective of type of disturbance.

It is another object of the invention to provide a method and system practicable in any network configuration, in particular wherein converter stations of the DC multi-terminal transmission system may be interconnected and located in any suitable way and desired way.

These objects, among others, are achieved by a method for controlling power flow in a multi-terminal DC power transmission system and by a corresponding system as claimed in the appended independent claims.

In accordance with the invention, a method for controlling power flow in a multi-terminal DC power transmission system is provided. The method comprises the first step of controlling the power flow to a steady state reference operating point for operating points within a control dead band defined for each respective converter station. The method further comprises the second step of controlling the power flow by means of droop control in at least one of the converter stations upon detection of exceeding of an end point of one or more of the control dead bands. By introducing a dead band within which steady state operation, including minor disturbances and regular load variations, is handled, the drawbacks of prior art are alleviated or at least mitigated. In particular, the use of dead bands renders the multi-terminal DC power transmission system less susceptible for errors in measurements. Further, by means of the invention, larger disturbances, for example failures resulting in islanded DC systems, as well as minor disturbances, can be handled. The invention thus provides a reliable and adaptable multi-terminal DC power transmission system. Further yet, the multi-terminal DC power transmission system in accordance with the invention can be utilized for any type of network configuration, including complex network configurations. The solution is thus suitable for all types of network configurations and this in turn provides a high flexibility when deciding converter station locations. In particular, owing to the introduced use of dead band in combination with droop control, there is no need for a common voltage reference during minor disturbances and mentioned problems of the prior art is overcome and any type of network configuration can be handled.

In accordance with an embodiment of the invention the steady state reference operating points are related to a voltage profile of steady state operation of the multi-terminal DC transmission system and the control dead band are defined as steady state operation.

In accordance with another embodiment of the invention, the droop characteristics for the droop control are defined individually for each converter station. Further, a particular converter station may have several different droop constants. The droop characteristics of the converter stations are one part for determining power sharing within the multi-terminal DC transmission system and the DC voltage at disturbances.

In accordance with still another embodiment of the invention, each converter station is provided with limitations in power/current and overvoltages. Having break points in the droop characteristics ensures that the capability of any converter station or the capability of its connected AC network is not exceeded.

In accordance with another embodiment of the invention the steady state reference operating point is determined by a master control unit of the multi-terminal DC power transmission system in consideration of DC voltage profile of the entire multi-terminal DC power transmission system. Transient and dynamic stability is ensured and the risks for interaction between power controls of different converter stations are thereby minimized.

Further features, defined in further dependent claims, of the invention and advantages thereof will become evident when reading the following detailed description.

The invention also relates to a corresponding multi-terminal DC power transmission system, whereby advantages similar to the above are achieved.

DETAILED DESCRIPTION OF EMBODIMENTS OF THE INVENTION

It is initially noted that a multi-terminal DC power transmission system is conventionally understood to comprise a DC power transmission system comprising more than two converter stations. Although the invention is described in connection with the multi-terminal DC transmission system, it is realized that the present invention is also applicable to a DC transmission system comprising only two converter stations.

The multi-terminal DC power transmission system is preferably a HVDC system, wherein HV may be defined to comprise any voltage level ranging for example from 300 kV, or even 80 kV. However, it is realized that the present invention is not restricted to any particular voltage levels or current levels, but is applicable to any such levels. Power transmission is understood to comprise transmission of electric power.

Figure 1:
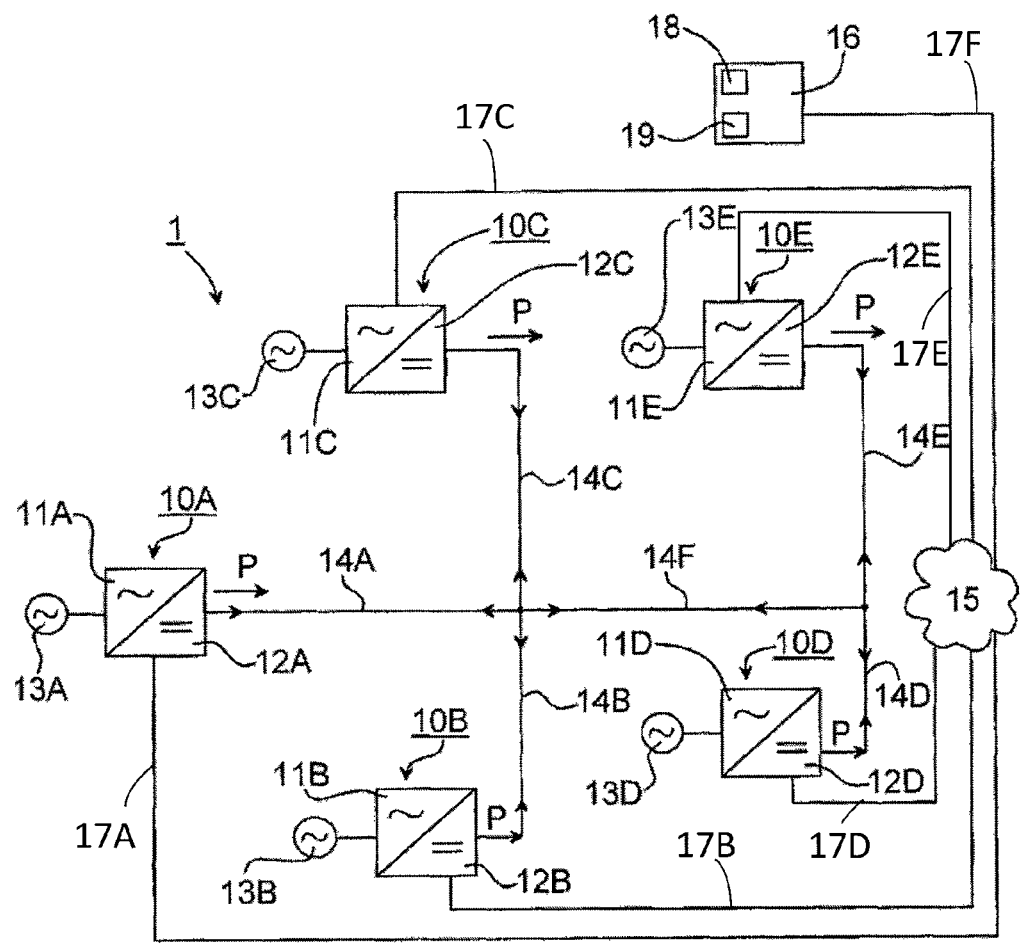
FIG. 1 illustrates an embodiment of a multi-terminal DC power transmission system in accordance with the present invention.

FIG. 1 illustrates an embodiment of a multi-terminal DC power transmission system 1 in accordance with the invention, in the following denoted DC transmission system in order of simplicity. The DC transmission system 1 comprises a number of converter stations 10A, 10B, 10C, 10E and 10E. Although five converter stations are illustrated in the FIG. 1, it is realized that any number of converter stations can be included.

The converter stations 10A, . . . , 10E in turn comprise inverters converting DC to AC, and/or rectifiers converting AC to DC. Other components and means conventionally used within a power network for enabling DC power transmission, but not forming part of the present invention, may also be included in the converter stations 10A, . . . , 10E.

The converter station 10A, . . . , 10E comprises an AC side 11A, 11B, 11C, 11D and 11E, connectable to an AC network 13A, 13B, 13C, 13D and 13E. The converter stations 10A, . . . , 10E further comprises a DC side 12A, 12B, 12C, 12D and 12E connectable to the DC transmission system 1 for power transmission. The converter stations 10A, . . . , 10E may be interconnected in any suitable manner, thereby constituting the DC transmission system 1. Each converter station 10A, . . . , 10E thus have an AC side 11A, . . . , 11E and a DC side 12A, . . . , 12E.

The converter stations 10A, . . . , 10E may be interconnected by means of power transmission lines, also denoted cable lines, or by overhead lines in a known manner. Such power transmission lines allows the power transmission and are illustrated in the FIG. 1 by reference numerals 14A, 14B, 14C, 14D, 14E and 14F.

The DC transmission system 1 further comprises a master control unit 16 responsible for coordination between the converter stations 10A, . . . , 10E. More specifically, the master control unit 16, also denoted grid master control, is arranged to coordinate the operation of the entire DC transmission system 1, and especially at disturbances and reconfigurations. These functions, as well as other control functions not mentioned, e.g. conventional control functions, may be implemented in software, hardware and/or firmware. The master control unit 16 may for example be a general purpose computer comprising appropriate software instructions enabling the desired control functions, for example able to send operating instructions to the converter stations. Examples of such control functions comprise receiving updated information regarding loading of all converter stations and especially the loading of a converter station pre-selected for DC voltage control; loading of all cable lines; DC voltages in all converter stations; limitations regarding voltage and current; desired dispatch for each converter station. The master control unit 16 may be located in one of the converter stations or located elsewhere in the DC transmission system 1.

Although the master control unit 16 is the main tool for proper restoration of the operation after faults and disturbances, the DC transmission system 1 is nevertheless designed so as to function even in case of failure thereof and/or in case of slow response from the master control unit 16.

Each converter station comprises a local control unit as well, for example enabling power regulation in the converter station.

In this context it is also noted that a sub-grid of the entire grid, i.e. the DC transmission system 1, may have its own area master control. The master control unit 16 then coordinates the area master controls for each area.

The converter stations 10A, . . . , 10E and the master control unit 16 are preferably connected to a communication network 15 via network connections 17A, 17B, 17C, 17D, 17E, 17F, respectively, whereby data can be exchanged between the converter stations and whereby the master control unit 16 is able to communicate with each converter station 10A, . . . , 10E. The communication network 15 may for example be a telecommunication network or a wide area network such as the Internet or any combination of communication networks.

Briefly, in accordance with the present invention the type of control of the DC transmission system 1 is dependent on the prevailing conditions therein; during steady state and minor disturbances the converter stations 10A, . . . 10E are arranged to work within a respective pre-defined dead band, while during large disturbances a droop control function is used.

Furthermore, limitation or break points are introduced in the droop characteristics for ensuring that neither any of the connected converter stations nor any of the connected AC networks are loaded beyond their respective individual capabilities.

Steady state operation and operation during minor disturbances in accordance with the invention is described first in the following. Minor disturbances comprise for example normal load variations within the DC transmission system 1.

During steady state, one of the converter stations 10A, . . . , 10E of the DC transmission system 1 is arranged to be DC voltage controlled, striving to keep its DC voltage $U_{DC}$ constant. The DC voltage controlled converter station controls the DC voltage in such a way that all (or some) of the converter stations can take their part of the disturbance. The remaining converter stations are arranged to be power controlled, striving to keep their power P constant.

In the DC transmission system 1 only one converter station is in DC voltage control, which converter station may be pre-selected for DC voltage control. The other converter stations are pre-selected for power control, or are else in islanded network operation. A converter station in islanded network operation is disconnected from the DC transmission system 1 and is controlling both the frequency and the AC voltage, that is, the master control is not controlling the converter station.

The converter station that is pre-selected for DC voltage control always operates in DC voltage control. This is in contrast to the converter stations pre-selected for power control, which operates in DC voltage control when disconnected from the DC transmission system 1. When the converter station pre-selected for power control is re-connected to the DC transmission system 1, it is transferred to power control.

The converter station to be in DC voltage control may be suitably chosen, for example a converter station centrally located within the DC transmission system 1 and/or being connected to a relatively stable and strong ac-network. The connected ac network of the chosen converter station should have the capability to temporarily take the balance power variation due to load variations in converter stations operating in islanded network operation, in frequency control, in power oscillation damping etc. The chosen converter station should be close to the electrical central point and the DC voltage should be close to the median DC voltage of the DC transmission system 1. However, the choice of converter station in DC voltage control may be selected in any other suitable way.

Each converter station in power control controls its AC side power to a reference value, a steady state reference operating point, provided that the dc-voltage is within acceptable limits. The limits of a converter station are described more in detail later. Only converter stations in normal power control can control their power and the converter station in DC voltage control has to take the balance. The power of converter stations in power control can be controlled in any suitable manner, for example by means of conventional PI regulation, performed by the local control unit.

It is noted that for the DC transmission system 1, a converter station set in power control mode may be placed on equality with current control mode, as the power is nearly linear with the current.

In order to ensure transient and dynamic stability and for minimizing the risks for interaction between power controls of different converter stations, the DC voltage in a central point of the system is fixed in a short term. Otherwise, power changes in any converter station will result in voltage variation in all other converter stations, which is to be counteracted by the power control in those converter stations. The set point for the DC voltage reference for the converter station in DC voltage control is defined by the master control unit 16, set in view of the DC voltage profile of the complete DC transmission system 1.

Transiently and dynamically the converter station pre-selected for DC voltage control controls its voltage to the above short-term fixed reference within a defined power range for normal operation, i.e. within a control dead band for the voltage controlled converter station. The remaining converter stations, i.e. the converter stations pre-selected for power control, control their ac side power to the desired order value as long as the DC voltage is within a defined voltage range for normal operation, i.e. within a control dead band for the power controlled converter stations. Outside the defined voltage/power range for normal steady state operation, the converter station has a voltage/power droop characteristic, which is described more in detail later in the description. The normal steady state operation also includes minor disturbances, for example normal load variations of the DC transmission network 1.

The power, current and voltage limits of a converter station are normally defined by local conditions. Such local conditions are communicated to the master control unit 16 from each converter station 10A, 10B, 10C, 10D, 10E. Based on DC transmission system 1 dispatch, the DC voltage profile of the system and known restrictions and limitations, the master control unit 16 defines a number of settings:

The DC voltage reference set point for the converter station in DC voltage control, The power order for the converter stations in power control, The dead band in power and DC voltage, respectively, before activating the droop characteristics, the dead bands being determined individually for each converter station, The droop constant(s) for each individual converter station, The operating limits of each converter, i.e. limitations regarding voltage and current.

Figure 2:
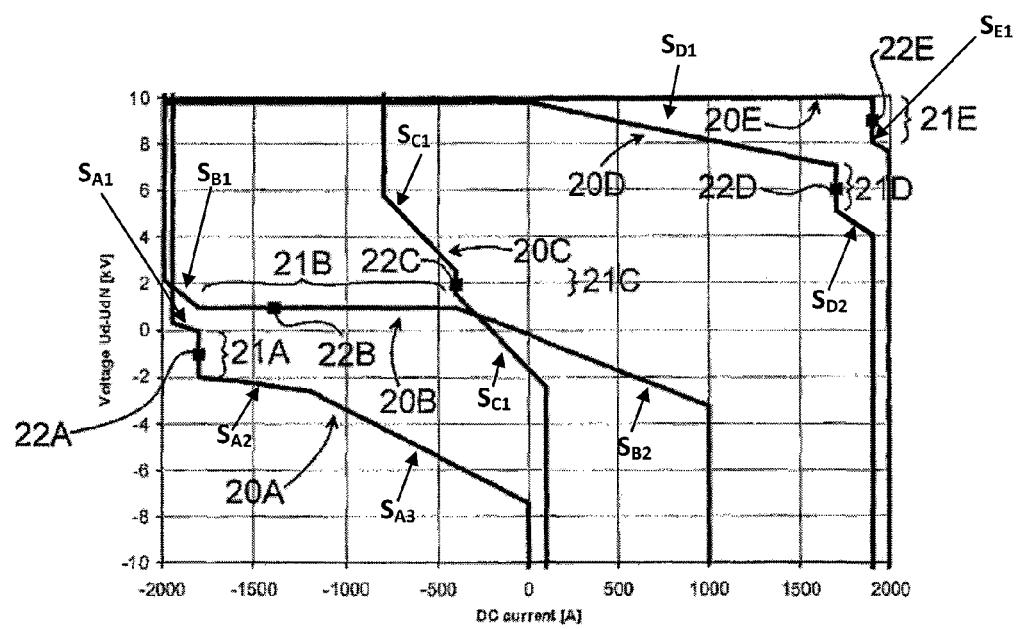
FIG. 2 illustrates exemplary converter station characteristics.

With reference now to FIG. 2, an example of characteristics 20A, 20B, 20C, 20D and 20E for the five converter stations 10A, ..., 10E, respectively, connected to the DC transmission system 1 is illustrated.

For each converter station, a dead band is defined in accordance with the above described. The dead bands are indicated in the FIG. 2 at reference numerals 21A, 21B, 21C, 21D and 21E for the respective converter stations 10A, 10B, 10C, 10D and 10E.

The small squares indicate the steady state operating points 22A, 22B, 22C, 22D, 22E of the respective converter stations. Each respective steady state operating point 22A, 22B, 22C, 22D, 22E is related to the local DC voltage at the respective converter station during steady state operation. However, the steady state operating points 22A, 22B, 22C, 22D, 22E are strongly correlated. The difference in voltage is the voltage drops of the cables in the DC transmission system 1. Converter station 10B is pre-selected for DC voltage control while the other converter stations 10A, 10C, 10D and 10E operate in power control.

As long as the operating point of a converter station is within its defined dead band, the converter station controls its voltage or power to the short-term fixed reference. In particular, the converter station 10B pre-selected for voltage control controls its voltage to the short-term fixed reference within its dead band 21A. The converter station 10B has a power dead band 21A, within which the power is allowed to vary and still be considered to be within normal operation. The converter stations 10A, 10C, 10D, 10E that are in power control have voltage dead bands 21A, 21C, 21D and 21E, respectively, within which the voltage is allowed to vary and still be considered to be within normal operation.

The sloping part of the characteristics of FIG. 2 illustrates droop characteristics of the converter stations. It is noted that a converter station may have one or several different droop characteristics. It can be seen from the FIG. 2, that converter station 10A, for example, has three different droop constants $S_{A1}$, $S_{A2}$, $S_{A3}$, while converter station 10B has two different droop constants $S_{B1}$, $S_{B2}$, and converter station 10C has a single droop constant $S_{C1}$. In addition, converter station 10D has two different droop constants $S_{D1}$, $S_{D2}$, and converter station 10E has a single droop constants $S_{E1}$.

As mentioned earlier, there are set power/current and over-voltage limits for each converter station. In FIG. 2 such limits are also illustrated. The power/current limitations of the converter stations combined with the power limitations of its connected AC network are shown as vertical lines. The horizontal lines at +10 kV represent maximum allowed DC voltage for operation, i.e. an exemplary rated voltage for converter stations 10D and 10E is +10 kV.

As an example, the converter station 10B, that is pre-selected for DC voltage control, will take the power imbalance within its dead band 21B in power. The combined characteristics for converter station 10B shown in FIG. 2 prevents that the converter station in DC voltage control is overloaded. The converter station control will prevent that the inverter is overloaded. It is the duty of the master control unit 16 to define the parameters of the converter station characteristics in such a way that the DC voltage is kept within the desired and set range even at equipment outages and other types of disturbances.

It is noted that the master control unit 16 may order more stringent limitations than the limitations set based on local conditions.

The converter station characteristics, i.e. the dead bands, the droop constants, and sometimes even the converter station limits, may have to be adapted to some degree. The characteristics may for example have to be adapted to the actual power flow of the DC transmission system 1. Thus, at a significant change of the DC transmission system 1 power flow or of the conditions of the connected AC networks 13A, ..., 13E, the parameters of the converter station characteristics has to be recalculated by the master control unit 16 and transmitted to the converter stations 10A, 10B, 10C, 10D, 10D.

FIG. 2 thus illustrates the inventive idea of dead band droop control of DC voltage versus power for five converter stations 10A, ..., 10E connected to the DC transmission system 1.

In case of larger disturbances, such as tripping of a cable line or outage of a converter station, droop control is activated. In particular, when the prevailing conditions of a particular converter station results in that the end points of the dead bands for that particular converter station are exceeded, the control of at least that particular converter station is changed to droop control. That is, if the operating point falls outside the end points of the dead band, then droop control is activated.

In the droop control, any conventional droop control method may be used. For example, one droop control method is to operate all converter stations in the DC transmission system in DC voltage control with a voltage reference that is dependent on the power level, that is $$U_{ref} = U_{ref_{0}} - \text{droop}(P_{DC} - P_{DCref})$$

The characteristic is a constant DC voltage in series with a resistance and it is stable and works well for taking care of power variations as well as an outage.

An improved way of obtaining a common voltage reference is subject for a co-pending patent application, entitled "A method for controlling power flow within a DC power transmission network, control device and computer program product" and filed on even day with the present application. In short, the method comprises the step of controlling the power flow to a set operating point by using a common feedback signal, $U_{d,common} = U_d^{ref} + D^*(P_{PCC} - P_{PCC}^{ref})$, wherein $U_d^{ref}$ is a reference voltage set to be same for all converter stations, D is a droop constant, $P_{PCC}$ is active power injected into an AC network connected to the converter stations and $P_{PCC}^{ref}$ is a set reference power. The feedback signal is common to all of the converter stations and based on an overall voltage level in the DC transmission power network. The common feedback signal results in a highly improved reference tracking of set-points; it can be shown that each converter station tracks its power reference perfectly. An accurate load sharing in the DC grid during disturbances is accomplished and also accurate steady-state operation. The present invention may utilize such power flow control method.

Figure 3:
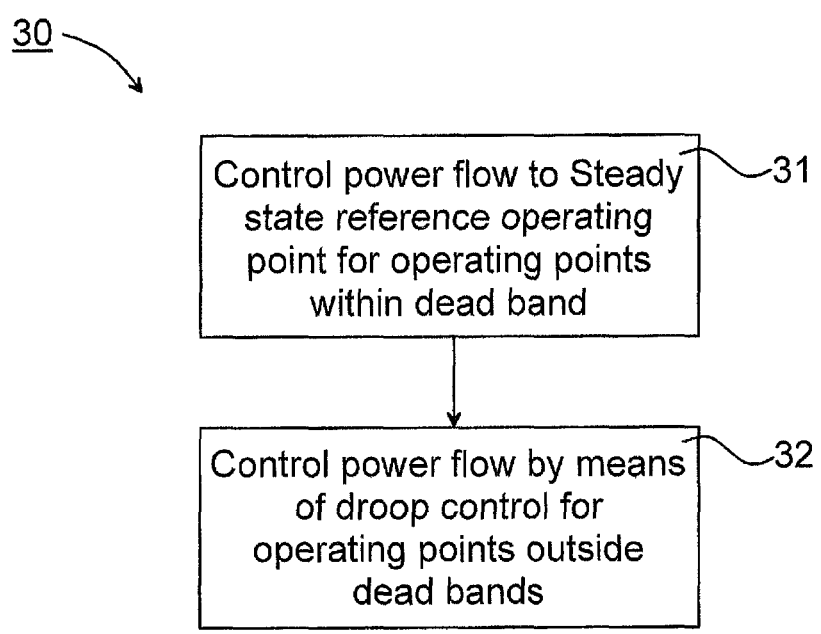
FIG. 3 illustrates a flow chart over steps included in a method in accordance with an embodiment of the invention.

FIG. 3 illustrates a flow chart over steps of a method in accordance with the invention for controlling power flow within the multi-terminal DC power transmission system 1 comprising two or more converter stations 10A, 10B, 10C, 10D, 10E. The method 30 comprises the first step of controlling 31 the power flow to a steady state reference operating point 22A, 22B, 22C, 22D, 22E for operating points that lie within a control dead band 21A, 21B, 21C, 21D, 21E defined for each respective converter station 10A, 10B, 10C, 10D, 10E. The converter stations strive to keep their voltage/power at their respective steady state reference operating point.

The control dead band comprises the earlier described power/voltage dead bands. That is, a power dead band for a voltage controlled converter station and a voltage dead band for a power controlled converter station.

The method 30 comprises the second step of controlling 32 the power flow by means of droop control in at least one of the converter stations 10A, 10B, 10C, 10D, 10E upon detection of exceeding of an end point of one or more of the control dead bands 21A, 21B, 21C, 21D, 21E. That is, when an end point of the control dead band for a converter station is exceeded, then the control mode is changed to droop control from the normal steady state control. The end points of the control dead bands are typically exceeded in case of a failure somewhere in the DC transmission system 1.

The steady state reference operating point 22A, 22B, 22C, 22D, 22E preferably comprises a voltage reference related to a voltage profile determined for steady state operation of the multi-terminal DC transmission system 1. The control dead bands 21A, 21B, 21C, 21D, 21E could be considered as steady state operation, and the steady state operation typically comprises power flow during normal operating conditions including minor load changes. The steady state reference operating point 22A, 22B, 22C, 22D, 22E is preferably determined by the master control unit 16 in consideration of DC voltage profile of the entire multi-terminal DC power transmission system 1.

In an embodiment, the control dead bands 21A, 21B, 21C, 21D, 21E are chosen so as to enable control of power flow within the control dead bands during steady state operation and including minor load changes within the multi-terminal DC power transmission system 1. The control dead bands are also preferably chosen individually for each converter station 10A, 10B, 10C, 10D, 10E based on requirements of each converter station.

In another embodiment, the control dead band of a converter station 10A, 10B, 10C, 10D, 10E comprises a power dead band or a voltage dead band. As described earlier, one of the converter stations 10B has a power dead band 21B, while the remaining converter stations 10A, 10C, 10D, 10E have voltage dead bands 21A, 21C, 21D, 21E.

In yet another embodiment, the droop characteristics for the droop control are defined individually for each converter station 10A, 10B, 10C, 10D, 10E.

In another embodiment, limitations in power/current and overvoltages are defined for each converter station 10A, 10B, 10C, 10D, 10E. thereby it is ensured that the capability of any converter station or the capability of its connected AC network is not exceeded.

The invention also encompasses the multi-terminal DC power transmission system 1 comprising two or more converter stations 10A, 10B, 10C, 10D, 10E, and means 18 for controlling power flow to a steady state reference operating point 22A, 22B, 22C, 22D, 22E for operating points within the control dead band 21A, 21B, 21C, 21D, 21E defined for each respective converter station 10A, 10B, 10C, 10D, 10E. With reference again to FIG. 1 the multi-terminal DC power transmission system 1 further comprises means 19 for controlling the power flow by means of droop control in at least one of the converter stations 10A, 10B, 10C, 10D, 10E upon detection of exceeding of an end point of one or more of the control dead bands 21A, 21B, 21C, 21D, 21E. The means 18, 19 are illustrated as part of the master control device 16, but could be separate devices. The means 18, 19 may be implemented in software, hardware and/or firmware.

It is noted that in order for the invention to be applicable for islanded DC systems, converter stations and/or transmission lines should be provided with DC breakers able to break a fault current and quickly isolate a faulty cable line or converter from the rest of the DC transmission system 1.

The invention claimed is:

1. A method for controlling power flow within a multi-terminal DC power transmission system comprising two or more converter stations, said method comprising:
   controlling said power flow to a steady state reference operating point for operating points within a control dead band defined for each respective converter station, wherein during the step of controlling said power flow to the steady state reference operating point for operating points within the control dead band, only one of the converter stations is in DC voltage control, and the other of the converter stations is/are in power or current control, and
   controlling said power flow by means of droop control in at least one of said converter stations upon detection of exceeding of an end point of one or more of said control dead bands.

2. The method as claimed in claim 1, wherein said steady state reference operating points are related to a voltage profile of steady state operation of said multi-terminal DC transmission system, and said control dead band being defined as steady state operation.

3. The method as claimed in claim 2, wherein said control dead bands are chosen so as to enable control of power flow within said control dead bands during steady state operation and minor load changes within said multi-terminal DC power transmission system and/or chosen individually for each converter station based on requirements thereof.

4. The method as claimed in claim 2, wherein said control dead band of a converter station comprises a power dead band or a voltage dead band.

5. The method as claimed in claim 2, wherein droop characteristics for said droop control are defined individually for each converter station.

6. The method as claimed in claim 2, wherein said steady state operation comprises power flow during normal operating conditions including minor failures and load variations.

7. The method as claimed in claim 6, wherein droop characteristics for said droop control are defined individually for each converter station.

8. The method as claimed in claim 6, wherein said control dead band of a converter station comprises a power dead band or a voltage dead band.

9. The method as claimed in claim 6, wherein said control dead bands are chosen so as to enable control of power flow within said control dead bands during steady state operation and minor load changes within said multi-terminal DC power transmission system and/or chosen individually for each converter station based on requirements thereof.

10. The method as claimed in claim 1, wherein said control dead bands are chosen so as to enable control of power flow within said control dead bands during steady state operation and minor load changes within said multi-terminal DC power transmission system and/or chosen individually for each converter station based on requirements thereof.

11. The method as claimed in claim 10, wherein said control dead band of a converter station comprises a power dead band or a voltage dead band.

12. The method as claimed in claim 1, wherein said control dead band of a converter station comprises a power dead band or a voltage dead band.

13. The method as claimed in claim 12, wherein said control dead band of one of said converter stations comprises a power dead band and wherein the control dead bands of the remaining converter stations comprises voltage dead bands.

14. The method as claimed in claim 1, wherein droop characteristics for said droop control are defined individually for each converter station.

15. The method as claimed in claim 1, wherein said steady state reference operating point is determined by a master control unit of said multi-terminal DC power transmission system in consideration of DC voltage profile of the entire multi-terminal DC power transmission system.

16. The method as claimed in claim 1, wherein limitations in power, current and/or voltages are defined for each converter station, and wherein said method comprises the additional step of controlling said power flow so that said limitations are not exceeded.

17. A computer program product embodied into a memory of a computer controlling a converter station, said computer program product comprising software code portions for carrying out the method as claimed in claim 1.

18. A multi-terminal DC power transmission system comprising two or more converter stations, and further comprising:
   a dead band control device for controlling power flow to a steady state reference operating point for operating points within a control dead band defined for each respective converter station, wherein the dead band control device is configured to control said power flow to the steady state reference operating point for operating points within the control dead band by controlling only one of the converter stations in DC voltage control, and controlling the other of the converter stations in power or current control, and
   a droop control device for controlling said power flow by means of droop control in at least one of said converter stations upon detection of exceeding of an end point of one or more of said control dead bands.

19. The multi-terminal DC power transmission system as claimed in claim 18, wherein the only one of the converter stations is provided with the DC voltage control and arranged to keep its voltage constant.

20. The multi-terminal DC power transmission system as claimed in claim 19, wherein the other of the converter stations is/are provided with the power control and arranged to keep their respective power constant.

* * * * *